Figure 1:
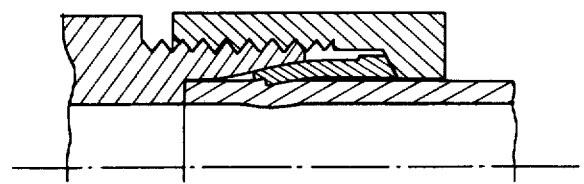

United States Patent [19]
Legris

[11] 3,889,989
[45] June 17, 1975

[54] PIPE COUPLINGS

[75] Inventor: Andre Legris, St.-Maur, France

[73] Assignee: Societe d'Exploitation des Brevets OCLAUR, Nantes, France

[22] Filed: May 2, 1974

[21] Appl. No.: 466,269

[30] Foreign Application Priority Data
May 9, 1973   France .............................. 73.16776
June 8, 1973  France .............................. 73.21132

[52] U.S. Cl. .............. 285/341; 285/249; 285/382.7
[51] Int. Cl. ........................................... F16l 19/02
[58] Field of Search ........ 285/382.7, 341, 342, 249, 285/348, 343

[56] References Cited
UNITED STATES PATENTS

| | | | |
|---|---|---|---|
| 2,396,163 | 3/1946 | Dies | 285/382.7 X |
| 2,693,374 | 11/1954 | Wurzburger | 285/382.7 X |
| 2,768,846 | 10/1956 | Gratzmuller | 285/382.7 X |
| 3,233,926 | 2/1966 | Walterscheid-Muller | 285/382.7 X |
| 3,428,339 | 2/1969 | Haulik et al. | 285/249 X |
| 3,484,123 | 12/1969 | Van Der Velden | 285/382.7 X |
| 3,787,080 | 1/1974 | Daniel | 285/382.7 X |

FOREIGN PATENTS OR APPLICATIONS

| | | | |
|---|---|---|---|
| 376,730 | 5/1964 | Switzerland | 285/341 |
| 1,101,839 | 4/1955 | France | 285/341 |
| 574,675 | 4/1959 | Canada | 285/341 |

*Primary Examiner*—Thomas F. Callaghan
*Attorney, Agent, or Firm*—Brooks, Haidt, Haffner & Delahunty

[57] ABSTRACT

This invention relates to high pressure pipe couplings of the kind in which one end of a bored coupling body is externally threaded to receive a rigid nut, said body and said nut each having an internal tapering surface which is in contact with an assymetrical bi-conical rigid bite-ring made of a ductile metal which is compressed by means of said ridges into circular grooves formed on the end of a pipe to be coupled, and in which the bite-ring has between its said tapering sections a central section that has a larger diameter than that of said tapering sections. In accordance with the invention, the central section of the bite-ring incorporates a circumferential sealing lip which is arranged to bear against an end face of the coupling body.

10 Claims, 9 Drawing Figures

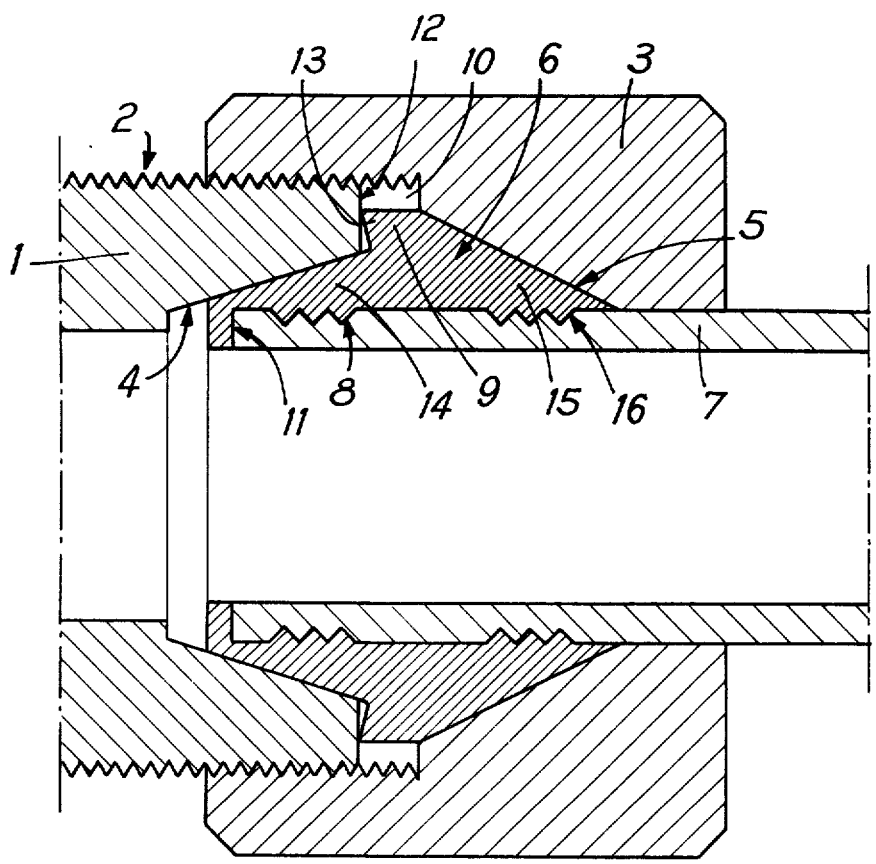

PIPE COUPLINGS

The present invention relates to high-pressure connectors or couplings for fluids which employ a compressed ring made of a ductile material. The connectors in question or couplings are capable of very wide use and are intended for both thick and thin-walled tubes, in all materials, pipes and of differing surface quality, even the worst (hot-drawn tubes, welded tubes, etc.). For simplicity such connectors or couplings will hereinafter be referred to as "pipe couplings".

Hydraulic apparatus may operate at pressures of the order of 600 bars, with surge pressures of 1200 to 1800 bars and there are few present day pipe couplings which are economical to produce which can withstand such pressures.

Pipe couplings are known in the prior art which employ a "bite" ring and which fasten themselves in the pipe by means of one or two sharp edges which sink into the material of which the pipe is formed. There are limits to the pressures at which this type of ring can be used and efforts have been made to raise the withstandable pressures by detail improvements to the couplings. However, despite everything, they are still not satisfactory for high pressures. The rings used with these couplings will not stand up to very high pressures and often deform by buckling, thus giving rise to leaks as a result of joints loosening, particularly with annealed pipes which deform easily. The connectors in question employ rings made of treated steel; the treatment, which is performed to increase the hardness of the cutting edges, makes the rings more fragile and hinders compression.

Rings with cutting lips only really grip the pipe at the front where the cutting lip is and at the rear, the pipe being either inadequately or weakly gripped in the central area and in any case in a way which is not effective for the whole length of the ring. This type of coupling which uses a "bite" ring causes excessive deformation and constriction in thin-walled pipes or tubes.

Other high-pressure couplings are known in which an attempt has been made to overcome the difficulty of getting the ring to grip the pipe by joining pipe and ring together by various methods e.g. welding, or screening, before assembly of the whole coupling.

The drawbacks of welding the ring to the pipe are that it is costly, time-consuming, not very practical and anneals the ring and pipe to too great a degree.

Screwing the ring onto the pipe is another method which is used. However, even though this gives a good attachment to the pipe, it entails costly and impractical mechanical operations on the pipe and it cannot be used with thin-wall or high-strength pipes or tubes. It will be realised how in this specification the description "pipe" is used for convenience of expression and includes all kinds of tubular member.

A device is also known in which the pipe is secured to the ring by expanding the pipe into prepared recesses in the ring. The object of this device is to attempt to remedy the majority of the shortcomings of high-pressure couplings, but numerous and serious ones still remain.

This device cannot be used with thick-wall pipes and it needs either annealed pipes or pipes which have been locally annealed. Furthermore, it requires that the condition of the surface of the pipe be good to very good and it also calls for the pipe to be worked in expansion beyond its elastic limit yet provides no sure means of checking that the pipe has not fractured in the central area of the ring.

The above prior art devices often cannot be additionally tightened without grave disadvantages, and, when they cannot, there is no way in which the ring can be changed, which means that the connection has to be re-made.

A high-pressure pipe coupling is also known from French Pat. No. 1 077 450 which is formed by a body containing a bore, at each end of which is an external threaded portion onto which screws a nut, the said body and the said nut each having an internal tapering surface which is in contact with a bi-conical ring which contains circular ridges which are compressed onto a pipe which has been grooved beforehand by means of cutter-wheel apparatus or any other grooving system.

This device, which has given good results at relatively high pressures, has limitations in that the ring is insufficiently strong and too little of it is enclosed by the body and the nut for it to withstand very high pressures.

It is a primary object of the present invention to remedy or minimise all the shortcomings and drawbacks already mentioned and to provide all-purpose connectors which have the following advantages:

a. high-pressure coupling which uses a cheap, untreated compression ring made of ductile metal which is easy to compress and does not cut into the tube;

b. coupling in which the sealing means are better than prior art couplings;

c. coupling in which the ring cannot be deformed by the strains caused by pressure;

d. coupling which can be used with pipes of all wall-thicknesses, both thick, medium and thin, with pipes made of any material, and with pipes of poor surface quality, including hot-drawn tubes, and welded tubes. (This signifies that fewer different types of connector need be held in stock);

e. Coupling which withstands loosening by vibration;

f. coupling which can be undone without trouble and without deforming the pipe or the coupling in a dangerous way;

g. coupling which can be undone and done up again without losing any of its original tightness of seal;

h. coupling which allows a ring to be removed and replaced without any of the pipe being sacrificed; and i. coupling which calls for only a minimum of inexpensive preparation and which can be assembled by untrained personnel, and which allow the personnel to check the standard of the prepared sealing surfaces visually in a very simple way.

The combination of pipe, ring and nut enables a coupling body of the conventional thread-and-taper type, and even coupling bodies of very widespread, standard types, to be used.

In accordance with the present invention, the compression ring, which is made of ductile metal, has a very short, deep, tubular central section which is flanked on either side by tapering sections whose size and angle of taper differ. On the side nearer the more gradual taper, the tubular central section has a radial area which includes a sealing lip formed by a taper which comes to a wide angle at the apex.

The ring is thus made up of three sections, namely: a first tapering section which compresses straightaway on commencement of tightening the coupling, a second tapering section of increased cross-section which compresses last, and a third, short, central indeformable section of constant, distinctly larger, cross-section which has a radial sealing lip. The ring as a whole is partically entirely enclosed and overlapped either by the nut or by the coupling body. The external sealing faces of the ring cover 50% of its outside surface. The internal area over which the ring forms a seal with the tube is equal to the total internal surface area of the ring, i.e. 100%.

For this reason the improved coupling is unaffected by pressure surges or shocks since the assembly is static and the ring, as a result of its total overlap with the pipe, behaves in such a way that it forms an integral part of the pipe.

The capacity for withstanding pressure is increased and shear strains on the ridges used to hold the ferrule on the pipe are cut down.

A restriction is also placed on radial strains in the interior of the female taper in the coupling body.

The central tubular section of the ring enables its useful cross-section to be greatly increased and any bending of the ring and any deformation to be prevented in this way.

Figure 2:
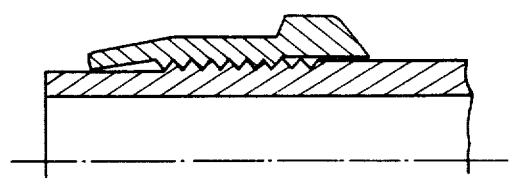
Figure 3:
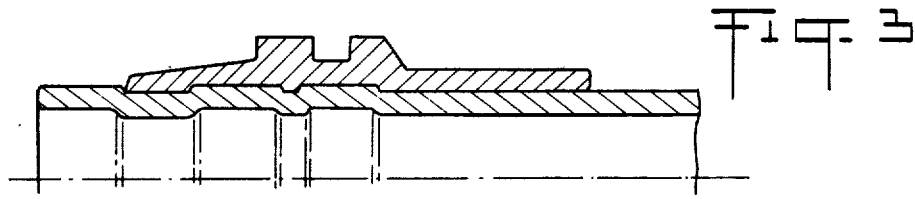
Figure 5:
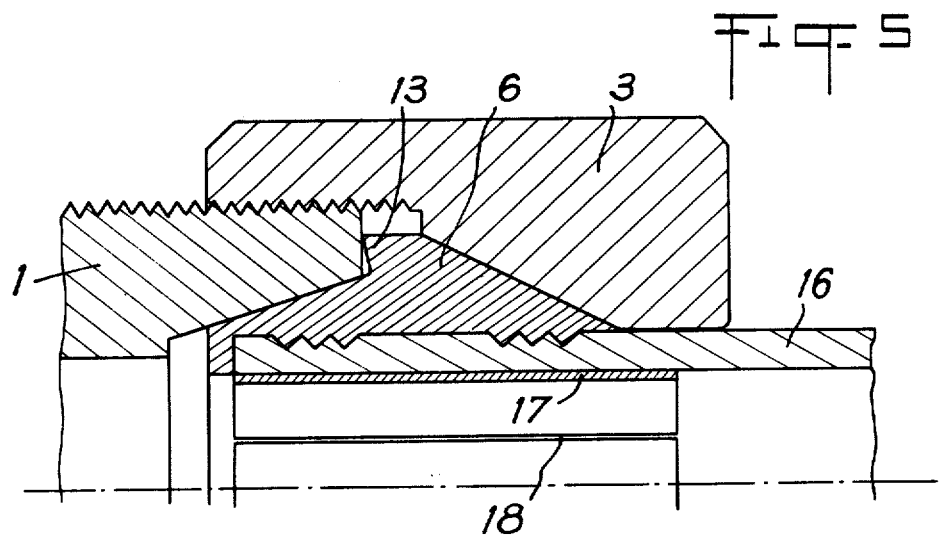
Figure 6:
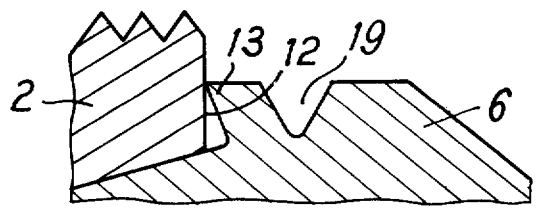
Figure 7:
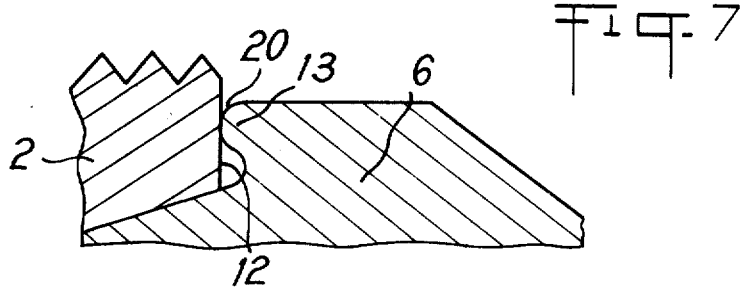
Figure 8:
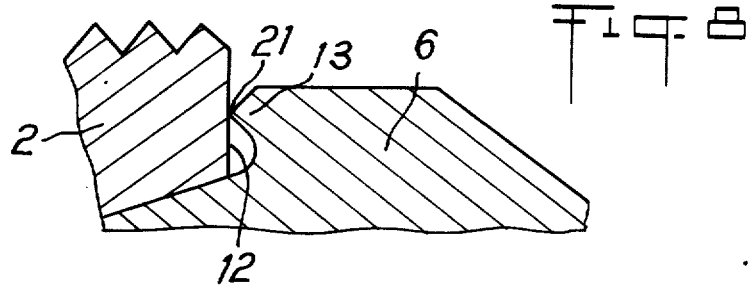
Figure 9:
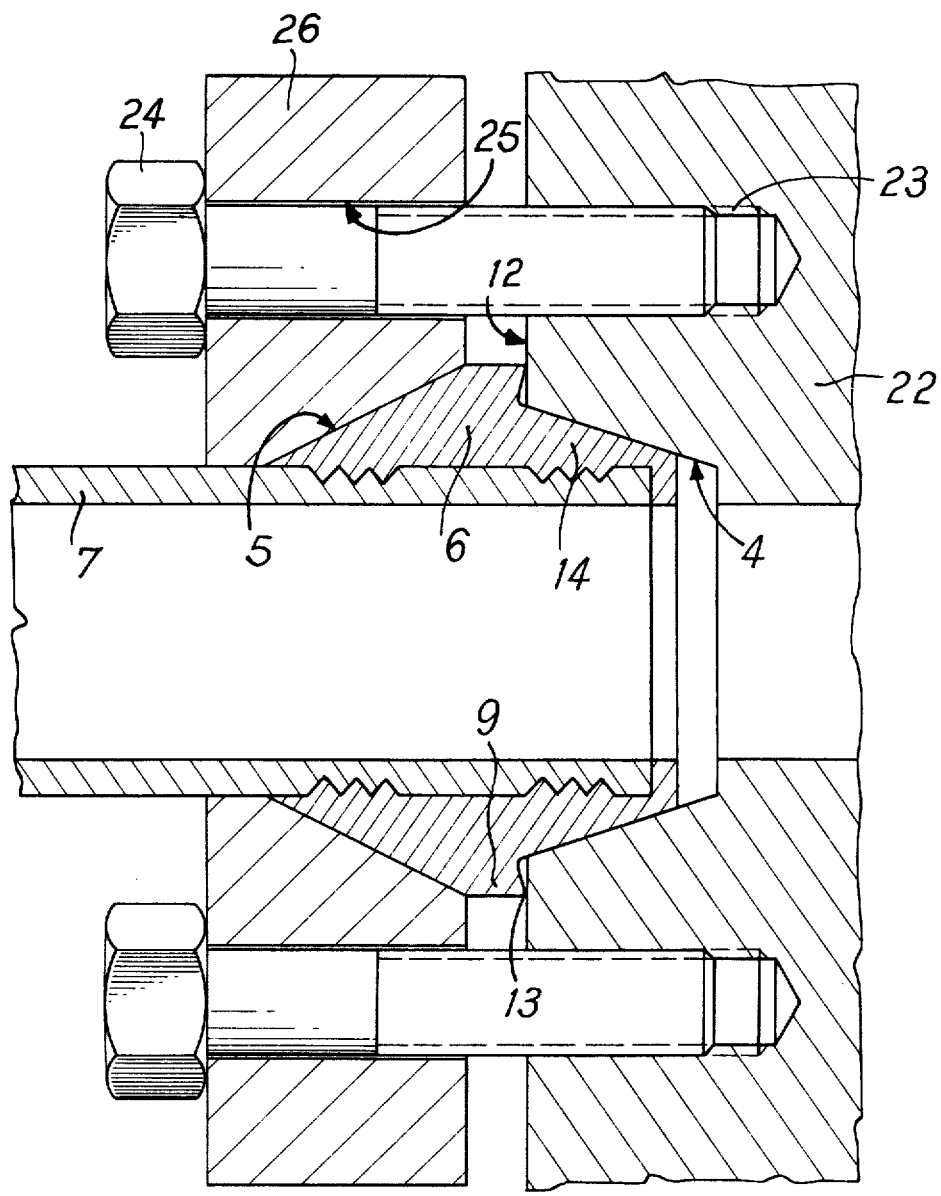

Other features and advantages of the invention will be better understood from perusal of the following description of a number of embodiments and by reference to the accompanying drawings, in which:

FIG. 1 shows an axial section through one-half of a prior art coupling in which a bite ring is used the coupling fastening itself in the pipe by means of one or two sharp edges which sink into the material of which the pipe is formed, FIG. 2 shows an axial section through one-half of a second prior art coupling in which the bite ring is screwed into the pipe, FIG. 3 shows an axial section through one-half of a third prior art coupling in which the pipe is secured to the bite ring by expanding the pipe into prepared recesses in the ring, FIG. 4 shows an axial section through one-half of a first embodiment of pipe coupling according to the invention, FIG. 5 shows an axial section through the coupling of FIG. 4 fitted to a pipe which has an internal lining, FIG. 6 shows a part-axial section through a bite ring having a semi-rigid lip, FIG. 7 shows a part-axial section through a bite ring having a rounded lip, FIG. 8 shows a part-axial section through a bite ring having a lip in the shape of a ridge, and FIG. 9 shows an axial section through a pipe coupling which employs a coupling flange.

Referring now to the drawings, FIGS. 1, 2 and 3 show prior art couplings as described above in the table of figures and since they are well known in the art, it is not considered necessary to describe them further.

In FIG. 4 is shown a coupling forming a first embodiment of the invention, which comprises a body 1 having a thread 2 onto which is screwed a nut 3. The body 1 and the nut 3 have internal tapering surfaces 4 and 5 respectively which are in contact with corresponding tapering surfaces on a bi-conical bite ring 6 which is to be compressed onto the end of a tube 7.

The dimensions of the body 1 and the nut 3 are such that the parts in question are extremely rigid and indeformable throughout.

The bi-conical bite ring 6 is made from a malleable metal to allow it to be compressed onto the pipe as a result of permanent deformation and final mechanical cold forging of the parts in contact, as well as to prevent any cutting action on the pipe. The pressure causes the material of the bite ring to cold-flow.

The way in which the angles of taper and the cross-sectional dimensions of the bite ring are decided on is governed by strict rules with the object of controlling the compression and forcing it to take place in two stages.

Between the tapering sections the ring 6 has a very short section 9 which extends into a space 10 between the body 1 and the nut 3, the diameter of the said section 9 being constant and considerably greater than the diameter of the tapering sections and the said section 9 preventing the ring from deforming either radially or along the generatrices of the pipe once the compression has been carried out.

This section 9 includes a ridge 13 which comes into contact with a radial face 12 on the body when a shallow section 14 is compressed.

Due to this, the hold on the pipe remains at a maximum, as also do the tightness of the seal and mechanical resistance to stresses of all sorts.

One of the main features of the invention is the nature of the cohesion between pipe and bite ring, which is different from that existing with conventional bite rings. The hold on the pipe is no longer the result simply of the strength of pressed-in ridges but is now supplemented by the grip exerted by the smooth parts of the ring on the pipe. This grip, which is produced by compressing the ductile metal bite ring (which beds in in the final stages of compression) squeezes the generatrices of the pipe to produce a nipping action on and friction against the pipe which are very nearly the same as are achieved with a hard, shrunk-on part.

The bite ring and the pipe are tightly connected and gripped.

The forces set by the pressure which tend to separate pipe and ring are thus withstood by:

1. the strength of a number of fully compressed ridges of large cross-sectional area and, 2. friction against all the smooth internal surfaces of the ring, which is the result of its grasping action on the pipe.

The high-pressure ring is also characterised by two groups of ridges 8 and 16 resulting from the compression which occupy set positions at either end of the ring.

When the pipe 7, fitted with the ring 6, has been placed in the body 1 and the nut 3, the first stage of tightening takes place. The effect of this is to cause the material of which the ridges on the ring are formed to be squeezed into the grooves 8 on the pipe as a result of reaction against the tapering surfaces 4 and 5.

The end of this first stage of tightening is reached when end 12 of the coupling body makes contact with the radial sealing lip 13 on the constant-diameter section 9 of the ring.

It will be realised that no further constricting forces can be exerted on the tube by section 14 of the ring 6 after this stage of assembly.

On the one hand the small diameter section 14 of the ring 6 is fully compressed onto the pipe, and on the other hand the tapering sections 4 and 5 of coupling and ring are firmly interengaged.

The second and final stage of tightening causes all the parts of the ring situated outside the coupling body to be compressed by a force which is directed inwards towards the centre of the pipe at an angle.

First of all, as a result of reaction between on the one hand the tapering sections 5 of nut 3 and ring 6 and on the other the sealing lip 13, this compression causes ridges 16 on the ring to be forced into the grooves in pipe 7 at the same time as it causes the two tapering sections to cold forge into one another.

The sealing lip 13 on the ring 6, which is pressed hard against face 12 of the coupling body, provides an additional seal of considerable efficiency which supplements the sealing action of taper 4.

At the same time, the tightening action presses the smooth internal parts of the ring hard against the generatrices of the pipe and squeezes them so that the resulting friction against and grasp on the pipe are very nearly the same as are achieved with a hard, shrunk-on piece.

The considerable cross-sectional area of section 9 of the ring prevents the ring from deforming against the pipe and vice-versa, thus preserving the advantages procured by compressing the two groups of ridges onto the pipe and by the gripping action of the smooth sections.

In this way the radial compression ensures a total and complete seal and reinforces resistance to stripping as a result of the continuous contact (the ridges on the bite ring compressed into the grooves on the pipe) and of the hold between the smooth parts of pipe and ring.

The limited radial compression exerted by taper 4 of body 1 on ring 6 and the compression which taper 5 of the nut exerts, with more difficulty, on the stronger section 15 of the ring, result in only a slight radial deformation of the pipe, the amount of compression working being far below the elastic limit of the material of which the pipe is made.

Nut 3 is secured against vibration and other loosening forces by the wedge effect and bedding action between its tapering section 5 and the taper of identical gradient on ring 6 with which section 5 makes contact for its whole length.

The two groups of grooves 8 and 16 formed on pipe 7 which are normally produced with a cutter-wheel apparatus, well-known in the art, are prepared by forcing the metal aside and not by removing it, the advantage of which is that the fibres of the metal are not cut and the pipe therefore retains its strength.

The troughs and crests of the ridges have small-diameter radii, thus avoiding sharp edges. In addition, this grooving operation makes up for any possible surface faults on the outside of the pipe at the same time as it produces a positive and checkable attachment for the ring. In fact, it is easy and customary after grooving to make a visual check on the standard of the sealing surfaces of the grooves before assembly. The surface finish needed to produce a seal is obtained in the grooves no matter what the quality of the pipe used is like.

This enables pipes of any quality to be used: e.g. thick-wall or thin-wall pipes, annealed or unannealed pipes, cold-drawn or hot-drawn unwelded pipes, hot-drawn-welded pipes, pipes made of metals of all types, or even pipes made from plastics materials.

In FIG. 4 it can be seen that the end of pipe 7 is in a precisely and stringently defined position relative to end 12 of coupling 1. A striking point to be noted is that, since grooves 8 are of a constant depth for all diameters and sizes of coupling, the position of the end 11 of the pipe will be the same in all cases and for all sizes of coupling. The pipe itself is located in the ring by grooves 8 and the ring is located relative to end 12 of coupling 1 by its sealing lip 13 which is pressed against the radial face 12 of the coupling.

It can be seen from FIG. 4 that, when the coupling assembly is taken down and re-assembled, the tapers will again take up the correct position, sealing lip 13 will again bear against face 12 of the coupling, and taper 5 in the nut may be tightened down again vigorously, thus restoring the connection to its initial tightness. It is thus easy to take down and reassemble a coupling of this type. On re-assembly the pipe again takes up the exact position it occupied on first assembly.

It can also be seen from FIG. 4 that, if a sealing fault is found, it is always possible to tighten nut 3 down further thus exerting greater compression at taper 5 and against section 15 of ring 6 and giving a tighter seal between sealing lip 13 and face 12. It is thus possible at all times to tighten up the coupling in order to increase compression and improve the seal. This can be done without greatly deforming the pipe, as a result of a uniform compression on ring 6.

If it should happen to be necessary to change a bite ring, this coupling is one of the only ones which allow this to be done. To do it, it is merely necessary to withdraw the pipe and the ring from the coupling, move back the nut 3 and saw through the ring 6 parallel to the axis of the pipe, stopping before the saw begins to cut into the tube. Two identical cuts are needed through the ring and it will then only be held in place by its ridges 8.

It is then easy to break the ring in two using a strong screwdriver. The pipe has thus been salvaged in its entirety and it is merely necessary to slip a new ring onto the pipe and put the assembly together again with the new ring 6 in the coupling to obtain a connection of high-pressure standard. It is noticeable that none of the prior art forms of coupling allows the operation of fitting a new ring to be carried out, because this operation is always hampered by the projecting ridges on the pipe.

In FIG. 5 the coupling of FIG. 4 is shown fitted onto a plastics tube 16 which has an internal lining 17 which is preferably made of metal and which has a slot 18 to allow the lining to be more easily inserted in the tube.

In FIG. 6 is shown another embodiment of the ring 6 in which a gulley 19 is provided behind the lip 13. This arrangement allows the lip 13 to be semi-rigid.

In FIG. 7 is shown a ring 6 which incorporates a lip 13 having a rounded edge 20 which makes contact with the radial face 12 of coupling body 2.

In FIG. 8 is shown a ring 6 which has a lip 13 an end 21 of which forms an edge which is in contact with the radial face 12 of body 2.

Devices are known which enable high-pressure compressed rings and in particular rings having cutting lips to be locked in position by means of a high-pressure coupling flange in which a seating has been specially formed.

Such devices have a major shortcoming relating to the tightening of the bolts or studs, this being especially difficult to accomplish. Since the clamping bolts are usually four in number and since the most widely used flanges are square, rectangular or round, it is usually necessary to perform the tightening process using pairs of opposing bolts. However, each time one pair of bolts is tightened, the other pair is automatically slackened. This drawback arises due to the fact that conventional bite rings provide no restriction on the amount of tightening and, since the flanges can be tightened up at an angle or out of true, a poor seal is produced. To overcome this drawback and to make such an assembly successfully, it is necessary to clamp down progressively using a set of shims.

To overcome these drawbacks a connecting device is used in which a bi-conical ring in accordance with the invention is clamped between the flanges and has an abutment which allows the flange to be stopped after compressing the front section, the sealing lip on the ring preventing the pipe and flange from moving and holding them aligned with the axis. The rear section of the flange is then tightened down, being accurately guided by the rear tapering section, the compression taper being of great strength. This arrangement allows the flange bolts to be clamped down hard with the minimum of precautions.

In FIG. 9 is shown a body 22 to which a flange 26 is attached by means of bolts 24. The bolts fit through holes 25 in the flange and screw into internally threaded holes 23 in body 22.

Body 22 and flange 26 have internal tapers 4 and 5 respectively which are in contact with corresponding tapering surfaces on a bi-conical bite ring 6 which is compressed onto one end of a pipe 7 as described above.

Between its tapering sections, ring 6 has a very short section 9 which incorporates a ridge 13 which comes into contact with a radial face 12 of the body when a shallow section 14 is compressed.

Various modifications may, of course, be made by the man skilled in the art to the devices or methods which have just been described simply as non-limiting examples, without departing from the scope of the invention as defined by the appended claims.

I claim:
1. In a high pressure coupling comprising:
   a first rigid body having a face end and an opposite end and a bore extending from one of said ends to the other, a portion of said bore having a conical surrounding surface which tapers from a first predetermined diameter at said face end to a smaller diameter at a predetermined distance from said face end and said face end having a face surface extending radially outwardly from and around said bore,
   a second rigid body for securing an end portion of a pipe having a plurality of axially spaced, peripherally continuous, peripheral grooves in said end portion to said first rigid body, said second rigid body having a face end for facing said face end of said first rigid body and an opposite end and a bore extending from said face end of said second rigid body to said opposite end thereof, a portion of said last-mentioned bore having a conical surrounding surface which increases from a first diameter substantially equal to the outer diameter of said end portion of said pipe to a second larger diameter in the direction from said opposite end of said second rigid body to said face end of the latter, and means for securing said second rigid body to said first rigid body including means for forcing one said body toward the other,
   the combination therewith of:
   a sealing ring for mounting intermediate said first and second rigid bodies and sealing said bodies to said pipe, said ring having an axially extending bore of a diameter substantially equal to said first diameter of said bore of said second rigid body, having first and second, conical and oppositely tapering outer surface portions and an intermediate outer surface portion intermediate said first and second outer surface portions, said latter portions decreasing in diameter from said intermediate surface portion in directions away from the latter and the tapers of said first and second outer portions corresponding respectively to the taper of said conical surrounding surface of said first rigid body and to the taper of said conical surrounding surface of said second rigid body, said intermediate surface portion, at least at the end thereof nearer said first outer surface portion, having a diameter greater than said first predetermined diameter of said conical surrounding surface of said first rigid body and being connected at said end thereof to said first outer surface portion by a sealing lip surface which extends generally radially and around said bore of said ring, said sealing lip surface portion having an axially protruding lip which extends circumferentially of said ring and which is spaced radially outwardly from said first outer surface portion to permit said lip to contact said face surface of said first rigid body prior to any contact of the radially inward remainder of said sealing lip surface portion with said face surface, and said sealing ring being made of a malleable metal to permit the inner surface of said bore thereof to be deformed and fill said grooves in said end portion of said pipe upon forcing of one said body toward the other by said forcing means.

2. A coupling as set forth in claim 1, wherein the rate of taper of said conical surrounding surface of said second rigid body is greater than the rate of taper of said conical surrounding surface of said first rigid body.

3. A coupling as set forth in claim 1, wherein said means for forcing one said body toward the other comprises threads on one said body and mating threads on the other said body.

4. A coupling as set forth in claim 1, wherein one said body has a flange extending outwardly therefrom and said means for forcing one said body toward the other comprises threaded bolts engaging said flange and the other said body.

5. A coupling as set forth in claim 1, wherein the area of contact between the conical surrounding surfaces of said first and second bodies and said first and second outer surfaces portions of said ring is at least equal to 50% of the external surface area of said ring.

6. A coupling as set forth in claim 1, wherein said sealing lip surface, in cross-section, is inclined away from said second outer surface portion with the radially inward portion thereof nearer said second outer surface portion.

7. A coupling as set forth in claim 1, wherein said ring has a peripheral groove therein spaced from said sealing lip surface and intermediate the latter and said second outer surface portion.

8. A coupling as set forth in claim 1, wherein said lip, in cross-section, is arcuate.

9. A coupling as set forth in claim 1, wherein said lip, in cross-section, is V-shaped.

10. A coupling as set forth in claim 1 in combination with said pipe wherein said pipe has two groups of grooves, one of said groups of grooves underlying said first outer surface portion and the other of said groups of grooves underlying said second outer surface portion.

* * * * *